(12) United States Patent
Goza

(10) Patent No.: US 7,346,434 B2
(45) Date of Patent: Mar. 18, 2008

(54) ELECTRONICALLY CONTROLLED FLUID LIMITING APPARATUS AND METHOD FOR USE THEREOF

(76) Inventor: Michael Goza, 21702 Hannover Ridge Dr., Spring, TX (US) 77388

( * ) Notice: Subject to any disclaimer, the term of this patent is extended or adjusted under 35 U.S.C. 154(b) by 0 days.

(21) Appl. No.: 11/530,840

(22) Filed: Sep. 11, 2006

(65) Prior Publication Data

US 2007/0059839 A1    Mar. 15, 2007

Related U.S. Application Data

(60) Provisional application No. 60/596,168, filed on Sep. 9, 2005.

(51) Int. Cl.
*G05D 11/00* (2006.01)
(52) U.S. Cl. .................. 700/282; 73/861; 702/45
(58) Field of Classification Search ............... 700/282; 137/2, 455–456; 73/861; 417/375; 340/606; 702/45

See application file for complete search history.

(56) References Cited

U.S. PATENT DOCUMENTS

| | | | |
|---|---|---|---|
| 579,464 A | 3/1897 | Bentley | |
| 1,812,586 A | 6/1931 | Eider | |
| 1,956,145 A | 4/1934 | Burkhart | |
| 2,545,928 A | 3/1951 | Martin | |
| 2,642,076 A | 6/1953 | Tigert | |
| 4,280,530 A | 7/1981 | Yi | |
| 5,056,554 A * | 10/1991 | White | 137/486 |
| 5,568,825 A * | 10/1996 | Faulk | 137/624.11 |
| 5,637,789 A * | 6/1997 | Lawson | 73/40.5 R |
| 5,706,191 A * | 1/1998 | Bassett et al. | 700/9 |
| 5,920,265 A * | 7/1999 | Johnson et al. | 340/605 |
| 6,275,160 B1 * | 8/2001 | Ha | 340/606 |
| 6,397,687 B1 * | 6/2002 | Garmas | 73/861.79 |
| 6,968,856 B1 * | 11/2005 | Goza | 137/488 |
| 7,221,281 B1 * | 5/2007 | Young | 340/606 |
| 7,273,063 B2 * | 9/2007 | Lull et al. | 137/12 |

* cited by examiner

*Primary Examiner*—Alexander Kosowski
(74) *Attorney, Agent, or Firm*—Kenneth A. Keeling; Keeling Patents & Trademarks LLC

(57) ABSTRACT

A flow control apparatus and method for operating the apparatus are disclosed. The flow control apparatus comprises a main supply line, a first valve, a first pressure transducer, a rotary meter, a control line, an intermediate valve, a second pressure transducer, a second valve, and a digital controller. The digital controller executes the program for operating the flow control apparatus. The program permits monitoring and regulating the amount of fluid passing through the flow control apparatus. Additionally, leaks in the flow control apparatus can be detected by the program, prompting automatic shut down of the apparatus if desired. Further, the apparatus may terminate flow through predetermined set points, such as volume and time maximums.

17 Claims, 4 Drawing Sheets

ELECTRONICALLY CONTROLLED FLUID LIMITING APPARATUS AND METHOD FOR USE THEREOF

CROSS-REFERENCE TO RELATED APPLICATIONS

This application claims the benefit of U.S. Provisional Patent Application No. 60/596,168 entitled, "Digitally Controlled Fluid Limiting Apparatus," filed on Sep. 9, 2005 in the United States Patent and Trademark Office.

STATEMENT REGARDING FEDERALLY SPONSORED RESEARCH OR DEVELOPMENT

Not Applicable

BACKGROUND OF THE INVENTION

1. Field of the Invention

The present invention relates to devices that automatically limit fluid flow. Specifically, the present invention relates to devices that electronically shuts off uncontrolled primary fluid flow after a predetermined volume of continuous fluid flow is detected, limit consumption thereafter, and automatically resets the device.

2. Description of the Related Art

Flow metering devices are frequently employed to terminate the flow of a fluid after a predetermined amount of fluid has passed, or when the flow exceeds the normal limits. With water consumption becoming limited in many areas, it is increasingly important to detect and prevent over consumption or uncontrolled water usage.

Prior art teaches flow control devices designed to stop fluid flow that has continued for a predetermined amount of time. While having fluid consumption limited by time is helpful in certain situations, such as lawn care, a single predetermined length of time for all fluid usages is impractical. For example, the amount of time hat one desires a garden to be watered may be different than the amount of time needed to run a dishwasher. Thus, it would be an improvement to the art to have a device that stops uncontrolled fluid flow based on actual usage rather than time.

Prior art also teaches flow control devices that require a manual reset. However, requiring a manual reset is problematic in the event that the user is not present to reset the system. Therefore, it would be a further improvement in the art to provide an automatic reset to a flow control device.

Mechanical devices for limiting fluid flow based on volume and time are known in the art. However, these devices are complex in operation and require multiple parts, as well as requiring dedicated space for operation. Therefore, it would be an improvement to the art to have a control line that permits nominal fluid flow to the device outlet after the valve has shut off and that further permits the automatic reset of the flow control device after the point of uncontrolled flow, such as an open faucet or a leak, has been closed. It would be a further improvement over the prior art to provide an electronically controlled device that reduces the number of components, thereby reducing the space needed for the flow control device.

Other features and advantages of the invention will be apparent from the following description, the accompanying drawing and the appended claims.

DESCRIPTION OF THE INVENTION

Figure 1:
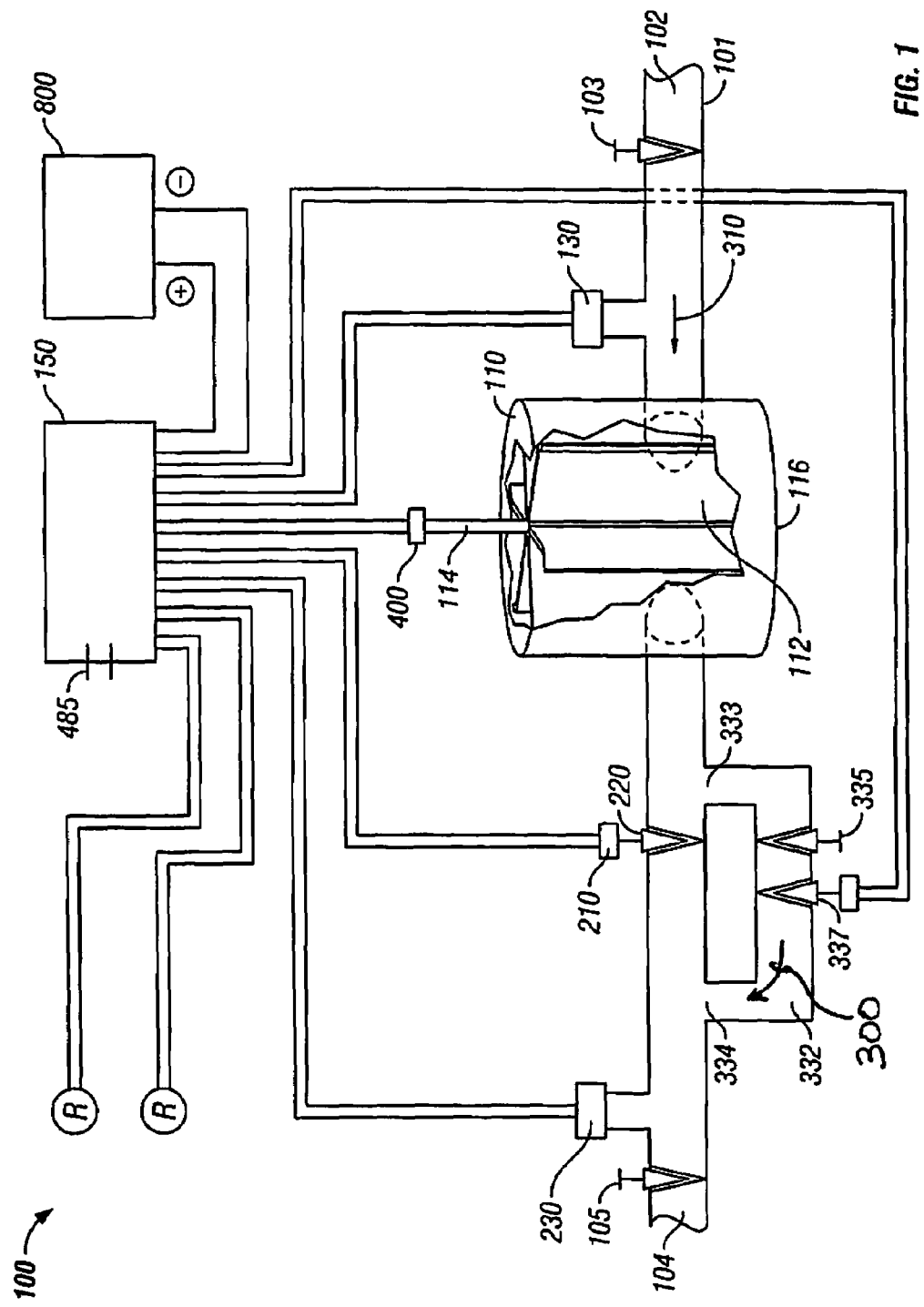
FIG. 1 is a schematic drawing of an example embodiment of the electronically controlled flow control device.

Referring to FIG. 1, the digitally controlled fluid consumption apparatus of the present invention is depicted as 100 and is used to automatically shut off the flow of a fluid at predetermined set points.

The flow control apparatus 100 comprises main supply line 101, a first pressure transducer 130, a rotary meter 110, control line 332, intermediate valve 220, a second pressure transducer 230, and a digital controller 150. A first valve 103 is depicted adjacent the device inlet 102, and a second valve 105 is depicted adjacent the device outlet 104. Main supply line 101 provides fluid communication of a primary stream 310 through device inlet 102, rotary meter 110, and device outlet 104. Control line 332 provides fluid communication of a secondary or control stream 300 from control line inlet 333 to control line outlet 334.

Opening first valve 103 allows stream 310 to flow into main supply line 101. First pressure transducer 130 monitors the pressure of the incoming stream 310. First pressure transducer 130 converts the pressure into digital format and transmits the digital signal to digital controller 150 via an electronic connection. Primary stream 310 ten enters rotary meter 110.

Rotary meter 110 provides revolution as a result of fluid flow through rotary meter 110. Rotary meter 110 includes a plurality of impeller blades 112, an impeller shaft 114, and an impeller housing 116. Impeller housing 116 rotationally retains impeller shaft 114. Impeller shaft 114 extends through impeller housing 116 to a point external of impeller housing 116. A shaft seal (not shown) prevents fluid leakage at the interface of impeller shaft 114 and impeller housing 116. Impeller shaft 114 interfaces with pulse transducer 400 at the external shaft end.

Primary stream 310 enters rotary meter 110. As primary stream 310 flows through impeller housing 116, force applied to impeller blades 112 causes impeller blades 112 and impeller shaft 114 to rotate about the impeller axis. Impeller shaft 114 induces rotation to pulse transducer 400, which translates rotations by impeller shaft 114 to a digital signal. This signal is transmitted to digital controller 150 via an electronic connection.

Primary stream 310 exits rotary meter 110, and continues flowing through main supply line 101, provided intermediate valve 220 remains in the open position. Intermediate valve 220 is controlled by solenoid 210. Solenoid 210 is electronically connected to digital controller 150 and receives instructions from digital controller 150 on whether to open or close intermediate valve 220. Should a programmed set point actuate solenoid 210 into closing intermediate valve 220, the flow of primary stream 310 will terminate at intermediate valve 220, thereby terminating rotation of rotary meter 110.

Provided intermediate valve 220 is open, primary stream 310 continues flowing through main supply line 101, passing second pressure transducer 230. Second pressure transducer 230 is electronically connected to digital controller 150 and provides a second fluid pressure monitoring point. Therefore, the overall pressure of primary stream 310 is monitored across the system, at first pressure transducer 130, proximate device inlet 102, and at second pressure transducer 230, between intermediate valve 220 and second valve 105, or point of use. Second pressure transducer 230 is used to reset the system, depending on the pressure of primary stream 310 versus the preset pressure of digital controller 150.

Closure of second valve 105 prevents further flow by primary stream 310 through main supply line 101, and consequently through device outlet 104. Simultaneously, flow is stopped through rotary meter 110. Without flow through rotary meter 110, rotation of impeller shaft 114 ceases. Second valve 105 serves as the control point for primary stream 310 to exit apparatus 100. Second valve 105 is presented as devices such as a faucet.

A control line 332 directs a control stream 300 from device inlet 102 to a control line outlet 334. Control line 332 is in fluid communication with primary line 101, and includes a control valve 335. Control valve 335 provides adjustability of the control stream 300 through control line 332 so that control stream 330 is a nominal flow rate. Shutdown solenoid valve 337 is located downstream from control valve 335. If a leak is present, and flow should continue through flow control apparatus 100, shutdown solenoid valve 337 provides a means to detect the leak and terminate all water flow through flow control apparatus 100.

In operation, pulse transducer 400 monitors the flow rate and usage. If these values reach the predetermined set point, solenoid 210 closes intermediate valve 220, thereby eliminating flow downstream intermediate valve 220. At this point, rotation of rotary meter 110 should decrease due to reduced water pressure and flow. The water pressure and flow will not completely cease as water remains directed through control line 332. If first and second pressure transducers 130 and 230 detect a pressure differential between them that is lower than the programmed set point, the system will reset itself. Further, if second valve 105 is manually closed, the system will reset after a predetermined period of time has elapsed. However, if second valve 105 is not manually closed, digital controller 150 transmits a signal to shutdown solenoid valve 337, which will terminate all flow of primary stream 310. Thereafter, primary stream 310 cannot flow through main supply line 101 until the system is manually reset by depressing a reset switch (not shown) on digital controller 150.

Because control line inlet 333 is intermediate rotary meter 110 and intermediate valve 220, a nominal flow of secondary or control stream 300 continues through control line 332 and out control line outlet 334. The continued flow of secondary stream 300 bypasses intermediate valve 220. This allows pressure to build on second pressure transducer 230. When second valve 105 is closed and the pressure reaches a predetermined set point, digital controller 150 instructs solenoid 210 to reopen intermediate valve 220, thereby resuming flow downstream intermediate valve 220.

Transformer 800 is electronically connected to digital controller 150. Digital controller 150 is programmable to accept set points such as total volume, schedule usage hours, automatic reset points, history times, and water actuation switch. Digital controller 150 is preferable mountable on vertical surfaces, but may also be mounted in alternative configurations. Digital controller 150 preferable provides an interface for connecting with a computer. Additionally, various appliances may be linked to digital controller 150, such that power is terminated to these appliances when primary stream 310 is terminated. This is particularly useful for appliances such as dishwashers and washing machines, which require water to operate.

Figure 2:
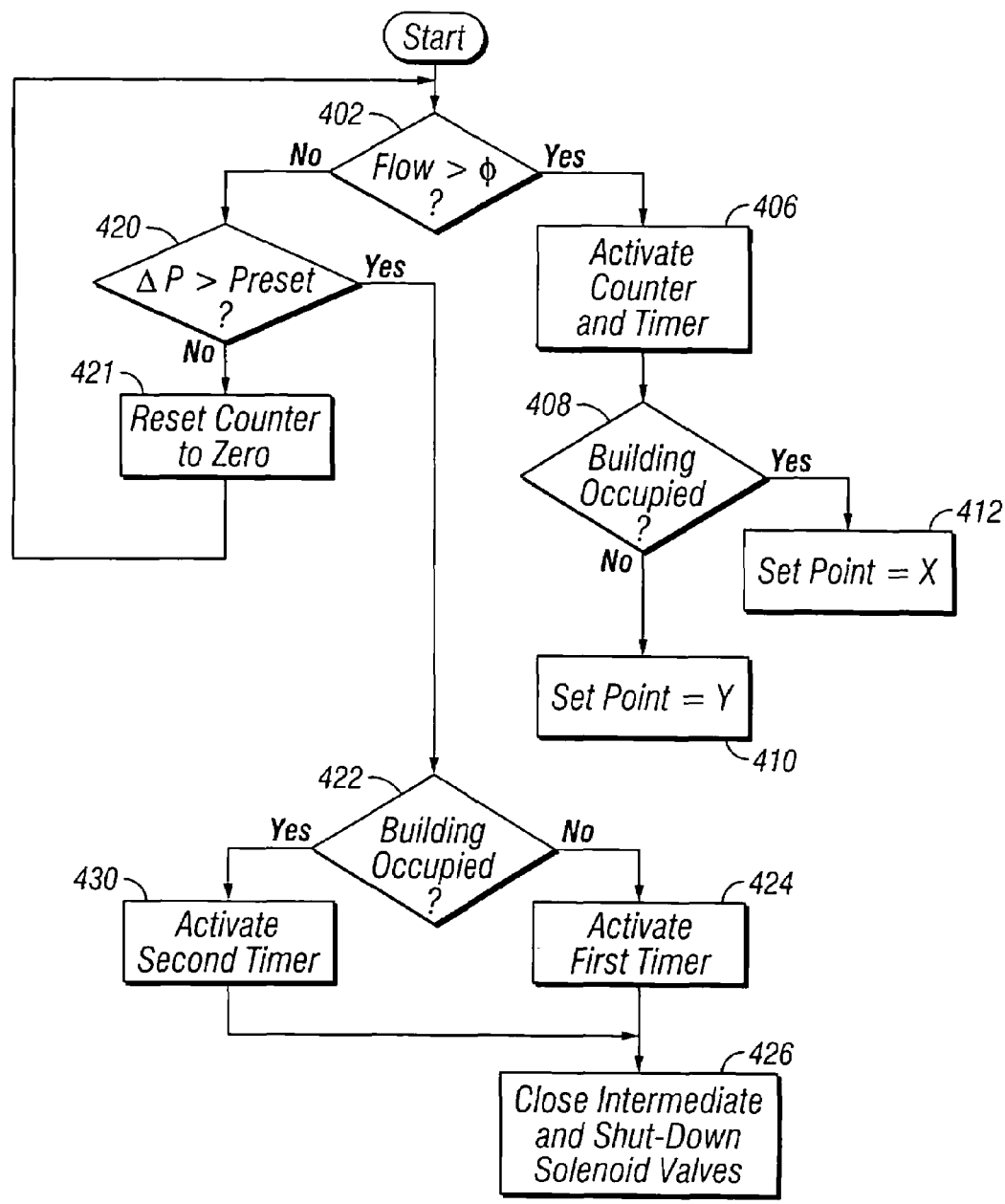
FIG. 2 is a flow diagram showing the steps of determining the applicable set point.

FIG. 2 is a flow diagram for determining the applicable maximum fluid flow set point, as well as a leak program for ascertaining leaks downstream of apparatus 100. This determination is performed by the digitally controlled fluid consumption device 100 depicted in FIG. 1.

The determination of the applicable maximum fluid flow set point initially begins with a decision 402 that determines whether there is any fluid flow through main supply line 101 of the fluid consumption device 100 depicted in FIG. 1. As previously stated, fluid flow through main supply line 101 results in rotation of impeller blades 112 of rotary meter 110, which is then converted into a digital signal by pulse transducer 400 and transmitted to digital controller 150. If the signal indicates that there is positive fluid flow through main supply line 101, a counter is activated 406 to record the amount of fluid that has passed through fluid consumption device 100. Alternatively, if the decision 402 determines that there is no fluid flow, a leak program executes at decision 420.

Once the counter has been activated 406, decision 408 determines whether the building is occupied. Determining whether the building is occupied can be achieved either through use of motion sensors, or through the use of a timer set to typical hours of occupation. If decision 408 determines that the building is occupied, the set point is set at a value 412, represented as "X" in FIG. 2. The set point 412 will be a predetermined value entered into digital controller 150, and represent the maximum amount of fluid that may be used when the building is occupied before the fluid consumption device 100 will terminate fluid flow through main supply line 101. The set point 412 should be based on typical fluid consumption values for the building. Alternatively, if decision 408 determines that the building is not occupied, the set point is set at value 410, represented at "Y" in FIG. 2. Set point 410 will also be a predetermined value entered into digital controller 150, and represent the maximum amount of fluid that may flow through fluid consumption device 100 when the building is not occupied before fluid consumption device 100 terminates fluid flow through main supply line 101. From here, the operation continues to operation 500, depicted in FIG. 3.

As previously stated, if decision 402 determines that there is no fluid flow, a leak program executes. Decision 420 determines whether the difference in pressure across the main supply line 101 is greater than the pressure preset value. The difference in pressure across main supply line 101 is determined by measuring the differences in pressures between first pressure transducer 130 and second pressure transducer 230. If the difference in pressure is greater than the pressure preset value, the operation will proceed to decision 422, which determines whether the building is occupied. Alternatively, if decision 420 determines that the difference in pressure is not greater than the pressure preset value, then the counter will reset to zero 421 and the operation will return to decision 402.

If decision 422 determines that the building is not occupied, a first timer will activate 424. If the pressure differential continues until the first timer time elapses, the intermediate and shutdown solenoid valves 220 and 337 will be closed 426. Fluid consumption device 100 preferably remains in this configuration until fluid consumption device 100 is reset. Alternatively, if decision 422 determines that the building is occupied, a second timer will activate 430. If the pressure differential continues until the second timer time elapses, intermediate and shutdown solenoid valves 220 and 337 will be closed 426.

Figure 3:
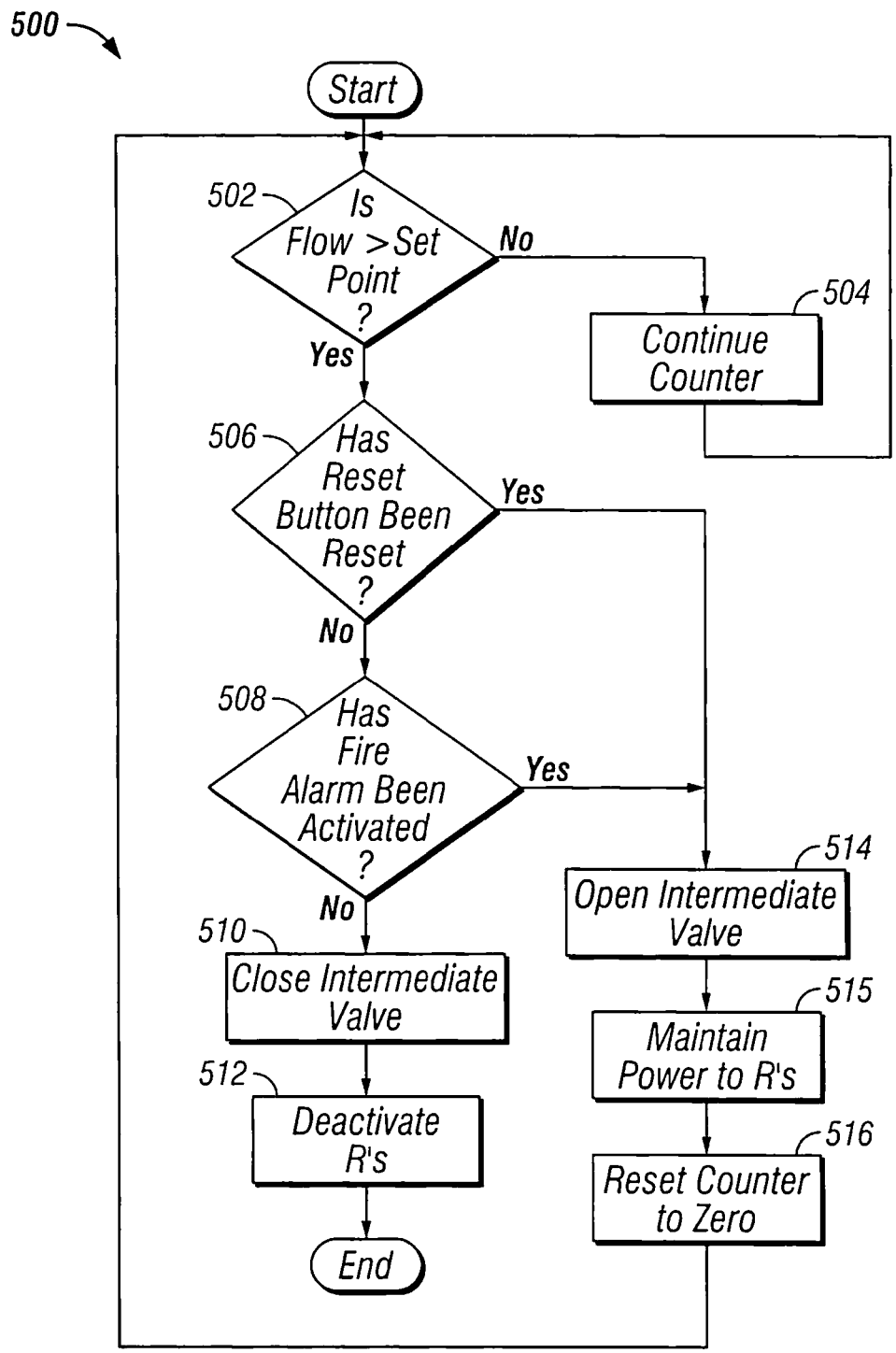
FIG. 3 is a flow diagram for operating the fluid consumption device when the fluid flow is greater than zero

FIG. 3 is a flow diagram 500 for operating fluid consumption device 100 when the fluid flow through main supply line 101 is greater than the previously established set point.

The operation 500 initially begins with a decision 502 that determines whether the fluid flow through main supply line 101 is greater than the established set point 410 or 412 outlined in FIG. 2. As previously stated, when there is a positive fluid flow, the counter is activated 406 (FIG. 2). If the decision 502 determines that the flow is less than the established set point 410 or 412, then the counter continues to track the volume of fluid passing through main supply line 101, and operation 500 returns to repeat decision 502. The loop continues until the flow exceeds the set point 410 or 412. At that point, decision 502 determines that the flow exceeds the established set point 410 or 412 and proceeds to decision 506.

Decision 506 determines whether the manual reset button has been reset. Providing a manual reset button permits the user to quickly override the determined set point 410 or 412, should a larger amount of fluid be necessary. If the manual reset button has been has been reset, decision 506 instructs digital controller 150 to open intermediate valve 220, continue providing power to the downstream relays 515, and reset the counter to zero 516. Operation 500 then returns to decision 502. Alternatively, if decision 506 determines that the manual reset button has not been reset, operation 500 proceeds to decision 508.

Decision 508 determines whether the fire alarm has been activated, thereby permitting the fluid consumption device 100 to continue to provide fluid in circumstances where a fire may require a volume of fluid that exceeds the allotted volume stipulated in set point determination 400. If the fire alarm has been activated, decision 508 instructs digital controller 150 to open, intermediate valve 220, continue providing power to the downstream relays 515, and reset the counter to zero 516. Operation 500 then returns to decision 502. Alternatively, if decision 508 determines that the fire alarm has not been activated, decision 508 instructs digital controller 150 to close intermediate valve 220, and deactivate the downstream relays 512.

Figure 4:
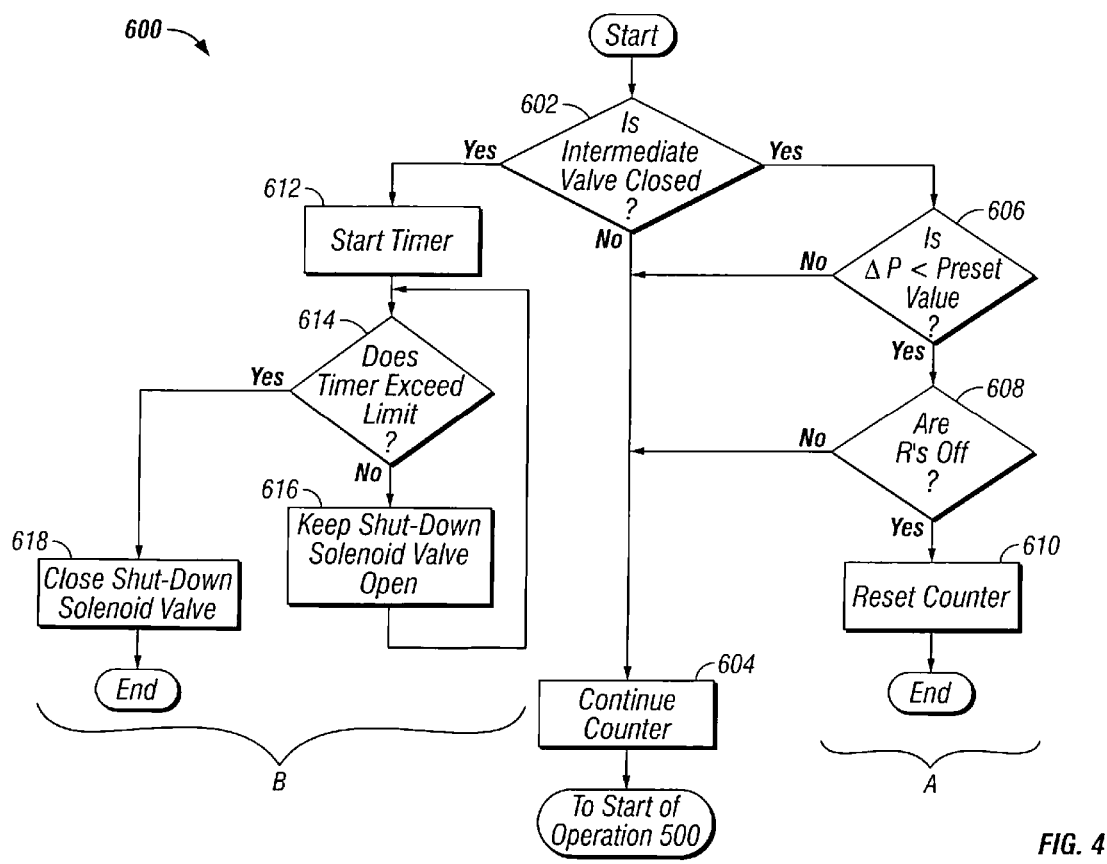
FIG. 4 is a flow diagram illustrating the operation for resetting the fluid consumption device.

FIG. 4 provides operation 600 for resetting fluid consumption device 100 once intermediate valve 220 has been closed and fluid flow has ceased through main supply line 101.

The operation 600 initially beings with a decision 602 that determines whether the intermediate valve 220 is closed. If decision 602 determines that the intermediate valve 220 is not closed, the counter continues to monitor the fluid flow 604, and returns to operation 500. Alternatively, if decision 602 determines that the intermediate valve 220 is closed, a series of coinciding events occur, designated as "A" and "B" in FIG. 4.

Referring to group A, operation 600 proceeds to decision 606, which determines whether the pressure differential measured by pressure transducers 130 and 230 is less than the preset value. The preset value is a predetermined value entered into digital controller 150. If decision 606 determines that the pressure differential is not less than the preset value, the counter continues to monitor the fluid flow 604, and the operation returns to operation 500. Alternatively, if decision 606 determines that the pressure differential is less than the preset value, operation 600 proceeds to decision 608.

Decision 608 determines whether the downstream relays are on or off. As previously stated, digital controller 150 can terminate power to the downstream relays if it is determined that the flow has exceeded the permitted value. The downstream relays can include common fluid-consuming appliances such as washing machines and dishwashers. If decision 608 determines that the relays are on, the counter continues to monitor the fluid flow 604, and the operation returns to operation 500. Alternatively, if decision 608 determines that the downstream relays are off, operation 610 resets the counter.

Referring to group B, operation 600 also proceeds from decision 602 to start the timer 612 when decision 612 determines that the intermediate valve 220 is closed. Once the timer has started, operation 600 proceeds to decision 614, wherein it is determined whether the timer exceeds the preset limit specified in digital controller 150. If decision 614 determines that the timer has not exceeded the limit, the shutdown solenoid valve 337 is kept open 616, and the operation returns to decision 614. Alternatively, if decision 614 determines that the timer does exceed the preset limit, the shutdown solenoid valve 337 is closed 618, and the fluid consumption device 100 awaits manual reset.

The foregoing description of the invention illustrates a preferred embodiment thereof. Various changes may be made in the details of the illustrated construction within the scope of the appended claims without departing from the true spirit of the invention. The present invention should only be limited by the claims and their equivalents.

What is claimed is:

1. A flow control device for terminating fluid flow after a predetermined quantity of fluid has been delivered through the device, which comprises:
   a primary line for conveying fluid through the device from an inlet to an outlet;
   a flow meter attached to the primary line for measuring flow quantities through the device;
   an intermediate valve in the primary line for controlling flow therethrough;
   a control line attached to the primary line for permitting a quantity of fluid to selectively bypass the intermediate valve;
   a shutdown valve in the control line for controlling flow therethrough;
   an apparatus associated with the device for measuring a fluid pressure differential in the device,
   a controller responsive to the flow meter for closing the intermediate valve when the predetermined quantity of fluid has been delivered, and
   the controller including at least one timer, the controller responsive to the timer for closing the intermediate valve and the shutdown valve when the fluid pressure differential has remained greater than a predetermined value for a predetermined period of time.

2. The flow control device of claim 1, further including a solenoid attached to the intermediate valve for opening or closing the intermediate valve.

3. The flow control device of claim 1, wherein the apparatus for measuring a fluid pressure differential in the device comprises first and second pressure transducers attached to the primary line and connected to the controller.

4. The flow control device of claim 3, wherein the first pressure transducer is attached to the primary line proximate the device inlet, and the second pressure transducer is attached to the primary line proximate the device outlet.

5. The flow control device of claim 1, wherein the controller is responsive to the apparatus for measuring a fluid pressure differential for closing the shutdown valve when the fluid pressure differential is less than a predetermined value.

6. The flow control device of claim 1, wherein the controller includes first and second timers, the first timer being activated when a building associated with the device is not occupied, and the second timer being activated when the building is occupied.

7. The flow control device of claim 1, further including apparatus for manually resetting the controller for permitting fluid flow to continue after the predetermined quantity of fluid has been delivered.

8. The flow control device of claim 7, wherein the apparatus for manually resetting the controller comprises a reset button on the controller.

9. The flow control device of claim 1, further including at least one relay electrically connected to the device for terminating power to a water consuming appliance when fluid flow through the fluid control device is terminated.

10. The flow control device of claim 1, wherein the flow meter is a rotary flow meter, and further including a pulse transducer associated with the flow meter for converting meter rotations into a digital signal.

11. A method for limiting fluid flow through a flow control device having a primary line for conveying fluid through the device from an inlet to an outlet, a flow meter attached to the primary line for measuring flow quantities through the device, an intermediate valve in the primary line for controlling flow therethrough, a control line attached to the primary line for permitting a quantity of fluid to selectively bypass the intermediate valve, a shutdown valve in the control line for controlling flow therethrough; and a controller responsive to the flow meter for closing the intermediate valve when the predetermined quantity of fluid has been delivered, the method comprising:
   determining whether the predetermined quantity of fluid has been delivered;
   if the predetermined quantity of fluid has been delivered, determining whether a reset button has been reset;
   if the reset button has not been reset, determining whether a fire alarm has been activated;
   if the fire alarm has not been activated, closing the intermediate valve for substantially terminating the fluid flow through the device;
   determining whether there is any fluid flow through the primary line; and
   if it is determined that there is fluid flow through the primary line, activating a counter and a timer to record the amount of fluid that has passed through the device.

12. The method of claim 11, further including the step, if the fire alarm has not been activated, of deactivating at least one relay connected to the controller for terminating power to an associated water consuming appliance.

13. The method of claim 12, further including the steps, if the reset button has been reset, of:
   opening the intermediate valve; and
   resetting a fluid quantity counter to zero.

14. The method of claim 12, further including the steps, if the fire alarm has been activated, of:
   opening the intermediate valve; and
   resetting a fluid quantity counter to zero.

15. The method of claim 11, further including the steps of:
   determining whether a building associated with the device is occupied;
   if it is determined that the building is occupied, setting a first maximum fluid flow setpoint representing the maximum amount of fluid that may be used when the building is occupied before the fluid control device will terminate fluid flow; and
   if it is determined that the building is not occupied, setting a second maximum fluid flow setpoint representing the maximum amount of fluid that may be used when the building is not occupied before the fluid control device will terminate fluid flow.

16. A method for limiting fluid flow through a flow control device having a primary line for conveying fluid through the device from an inlet to an outlet, a flow meter attached to the primary line for measuring flow quantities through the device, an intermediate valve in the primary line for controlling flow therethrough, a control line attached to the primary line for permitting a quantity of fluid to selectively bypass the intermediate valve, a shutdown valve in the control line for controlling flow therethrough; and a controller responsive to the flow meter for closing the intermediate valve when the predetermined quantity of fluid has been delivered, the method comprising:
   determining whether the predetermined quantity of fluid has been delivered;
   if the predetermined quantity of fluid has been delivered, determining whether a reset button has been reset;
   if the reset button has not been reset, determining whether a fire alarm has been activated;
   if the fire alarm has not been activated, closing the intermediate valve for substantially terminating the fluid flow through the device;
   determining whether there is any fluid flow through the primary line;
   if it is determined that there is no fluid flow through the primary line, determining whether the pressure differential across the primary line is greater than a predetermined value;
   if it is determined that the pressure differential is greater than the predetermined value, determining whether a building associated with the device is occupied;
   if it is determined that the building is occupied, activating a first timer; and
   if the pressure differential continues until the first timer time elapses, closing the intermediate and the shutdown solenoid valves.

17. The method of claim 16, further including the steps, if it is determined that the building is not occupied, of:
   activating a second timer; and
   if the pressure differential continues until the second timer time elapses, closing the intermediate and the shutdown solenoid valves.

* * * * *